UNITED STATES PATENT OFFICE.

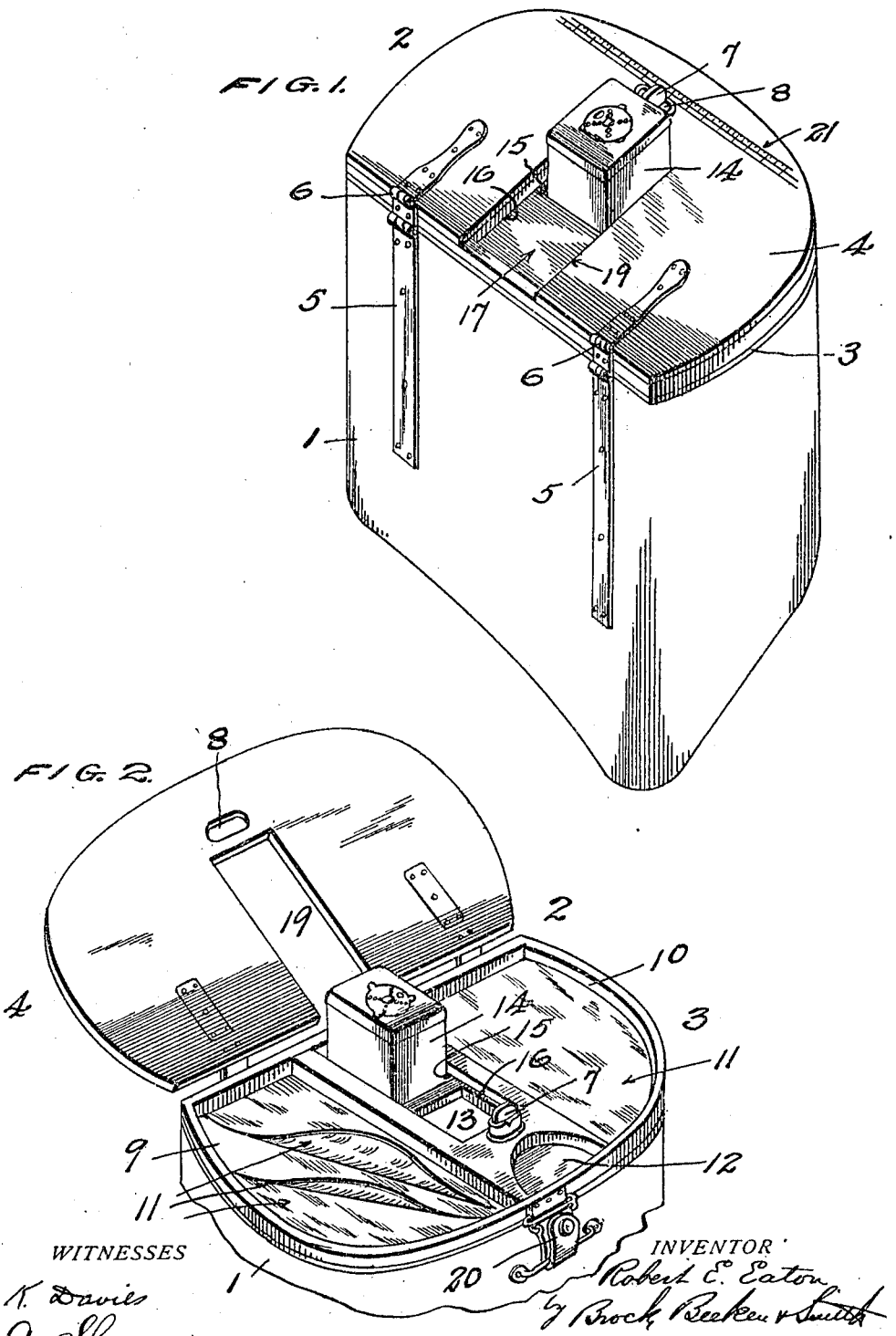

ROBERT E. EATON, OF UNION, OREGON, ASSIGNOR OF ONE-FOURTH TO WILL WRIGHT, OF DENVER, COLORADO, AND ONE-FOURTH TO C. W. JONES, OF UNION, OREGON.

CLOSURE FOR FISHING OR OTHER BASKETS.

956,801.     Specification of Letters Patent.     Patented May 3, 1910.

Application filed April 26, 1909. Serial No. 492,263.

*To all whom it may concern:*

Be it known that I, ROBERT E. EATON, a citizen of the United States, and resident of Union, in the State of Oregon, have invented a new and useful Improvement in Closures for Fishing or other Baskets, of which the following is a specification.

The present invention relates generally to closures and has more particularly reference to a cover or top for a fishing or other basket.

The main object of the invention is to obtain a compact structure capable of being applied to the fishing basket itself, in which the fisherman can keep tackle, bait, etc.

One of the features of the invention consists in making the closure in two parts so as to form a hollow cover in which may be placed the hooks, flies, leaders, etc.

Another feature of the invention consists in utilizing the bait box as a closure for an opening through the double cover.

Other features of structure will appear as the specification proceeds.

In the accompanying drawings I have shown a concrete and preferred form of the invention, it being understood, however, that variations in form and structure may be made without departing from the scope of the invention.

In the drawings: Figure 1 is a perspective view of a receptacle showing the closure applied thereto and in its closed position. Fig. 2 is another perspective view showing the top or cover of the closure open, exposing the interior of the hollow closure.

Similar characters of reference indicate corresponding parts in the different views.

1 indicates a receptacle of any form such as a fishing basket and 2 indicates the closure as a whole for said fishing basket. This closure is composed of two parts, the lower part being lettered 3 and the cover therefor or upper part being lettered 4. The closure 2 is secured to the receptacle in any suitable manner such as by means of the hinges 5. The upper part or cover 4 of the said closure is hinged independently to the said closure by means of the pivots or hinges 6. Suitable locking means is provided whereby the two parts of the closure may be locked or unlocked with respect to each other so that the cover 4 may be raised independently of the lower part 3 or the closure 2 as a whole may be raised or lifted in unison. The locking device here takes a very simple form and consists in the present instance of a knob 7 carried by the lower member 3 and extending up through the aperture 8 in the upper member or cover 4. The interior of this hollow closure may be arranged in many ways to suit the purposes for which it is intended to use it. In the present illustration it is shown as being arranged more particularly for fishing tackle, that is to say the smaller parts such as hooks, flies, leaders, sinkers, etc., and to this end it is, in the present instance, provided with two main compartments 9 and 10 which may be provided with leaves of flexible material 11 between which the hooks or other tackle may be placed, and kept from injury. Also, there is a small space in front, 12, which can conveniently be used for sinkers.

The lower part of the closure is provided with an opening 13 through which small fish may be slipped into the basket without lifting the closure or any part thereof as a whole. For the purpose of closing this opening, any means such as an ordinary slide or cover of any kind may be used, but in the present instance I prefer to utilize an auxiliary receptacle 14 which may be and is, in the present instance, the bait box. This bait box may be mounted in any suitable manner, but in the present instance is provided with laterally extending wings or spreaders 15 which are adapted to extend into grooves 16 so as to prevent the bait box from becoming displaced. The opening 13 does not extend all the way across the lower portion of the closure but only part of the way as shown, the remaining part 17 being solid.

The upper part of the closure is provided with an opening 19 of sufficient size to expose the opening in the lower part of the closure and to permit the bait box to extend up through it when in either position.

20 indicates a clasp arranged on the lower part of the closure and in front thereof which may conveniently be used to support a fly-book.

On the upper surface of the cover a scale 21 may conveniently be arranged.

I claim:

1. The combination with a receptacle, of a closure having an opening and an auxiliary receptacle slidingly mounted in the said closure adapted to close said opening in the closure when moved into a certain position and to uncover it when moved into another position.

2. The combination with a receptacle, of a closure for said receptacle, a cover for said closure, means whereby said cover may be lifted independently of the closure or in unison therewith, an auxiliary receptacle slidingly mounted in said closure and adapted when in one position to cover an opening extending through both the closure and the cover, and when in another position to uncover the said opening.

3. The combination with a receptacle, of a closure having an opening in its top, an auxiliary receptacle mounted on said closure and adapted to close the opening aforesaid when in one position and to uncover it when in another position, a cover for said closure having an opening corresponding to the opening exposing the opening in the closure and the auxiliary receptacle and means for moving the cover independently of the closure and the auxiliary receptacle or in unison at will.

4. In a top for a fishing basket, composed of two parts forming a hollow closure and having a central opening extending through both of said parts so as to provide access to the basket without moving the closure, a bait box adapted to close said opening when moved into a certain position and to uncover it when moved into another position, compartments within said hollow closure for the reception of fishing tackle, means for locking the parts of the closure together whereby the two parts thereof and the bait box may be moved in unison or independently at will.

5. The combination with a receptacle, of a two-part closure having an opening through both parts of the closure and an auxiliary cover or slide mounted in said closure and adapted to close said opening in the closure when moved into a certain position and to uncover it when moved to another position.

ROBERT E. EATON.

Witnesses:
A. E. PATTERSON,
J. P. WILLIAMS.